(12) United States Patent
Durand

(10) Patent No.: US 8,231,314 B2
(45) Date of Patent: Jul. 31, 2012

(54) CUTTING INSERT, CUTTING TOOL, AND METHOD OF MACHINING

(75) Inventor: Alain Durand, Doissin (FR)

(73) Assignee: Seco Tools AB, Fagersta (SE)

( * ) Notice: Subject to any disclaimer, the term of this patent is extended or adjusted under 35 U.S.C. 154(b) by 1157 days.

(21) Appl. No.: 12/058,883

(22) Filed: Mar. 31, 2008

(65) Prior Publication Data
US 2008/0240880 A1 Oct. 2, 2008

(30) Foreign Application Priority Data
Mar. 30, 2007 (SE) ........................ 0700860

(51) Int. Cl.
*B23B 29/03* (2006.01)
*B23D 77/00* (2006.01)
(52) U.S. Cl. ......... 408/188; 407/113; 408/231; 408/713
(58) Field of Classification Search .................. 409/132, 409/232, 234; 407/113; 408/1 R, 150, 187–188, 408/231, 233, 238, 239 R, 713; *B23B 29/00, B23B 29/02, 29/03; B23D 77/00, 77/02, B23D 77/06*
See application file for complete search history.

(56) References Cited

U.S. PATENT DOCUMENTS

| 909,401 | A | * | 1/1909 | Haber | 408/150 |
| 1,109,321 | A | * | 9/1914 | Charles | 408/182 |
| 1,233,045 | A | * | 7/1917 | Frick | 408/150 |
| 1,234,003 | A | * | 7/1917 | Frick | 408/150 |
| 1,241,953 | A | * | 10/1917 | Frick | 408/150 |
| 1,243,502 | A | * | 10/1917 | Frick | 408/150 |
| 1,831,371 | A | * | 11/1931 | Smith | 408/188 |
| 2,365,943 | A | * | 12/1944 | Eagleson | 408/154 |
| 2,618,990 | A | * | 11/1952 | Briney, Jr. | 408/188 |
| 2,689,394 | A | * | 9/1954 | Bentjens | 407/43 |
| 2,711,107 | A | * | 6/1955 | Jensen | 408/150 |
| 2,995,963 | A | | 8/1961 | Lavallee | |
| 3,380,137 | A | * | 4/1968 | MacPetrie et al. | 407/35 |
| 3,495,483 | A | * | 2/1970 | Janik | 408/211 |

FOREIGN PATENT DOCUMENTS

| DE | 10009721 A1 | 9/2001 |
| JP | 08187609 A * | 7/1996 |
| WO | 03097281 A1 | 11/2003 |
| WO | 2007003248 A1 | 1/2007 |

* cited by examiner

*Primary Examiner* — Daniel Howell
(74) *Attorney, Agent, or Firm* — WRB-IP LLP

(57) ABSTRACT

A cutting insert includes a body having a first surface, a second surface, and an intermediate surface. The intermediate surface includes a generally cylindrical main surface and at least one recess surface extending radially inwardly from the main surface, the main surface and the recess surface extending between the first surface and the second surface. Cutting edges are defined by intersections between the main surface and the recess surface.

19 Claims, 2 Drawing Sheets

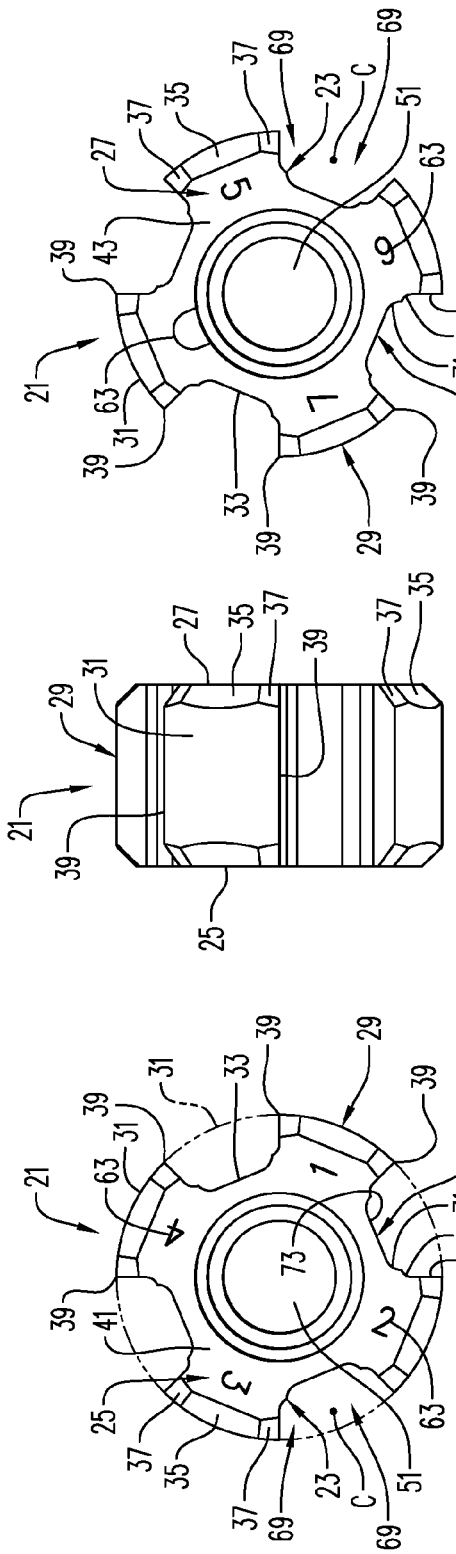
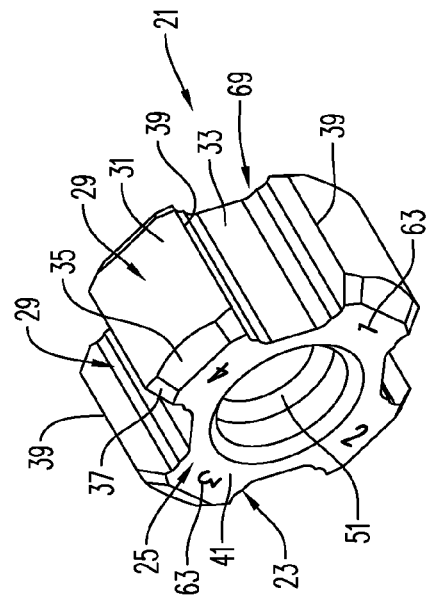
FIG. 1D
FIG. 1C
FIG. 1A
FIG. 1B

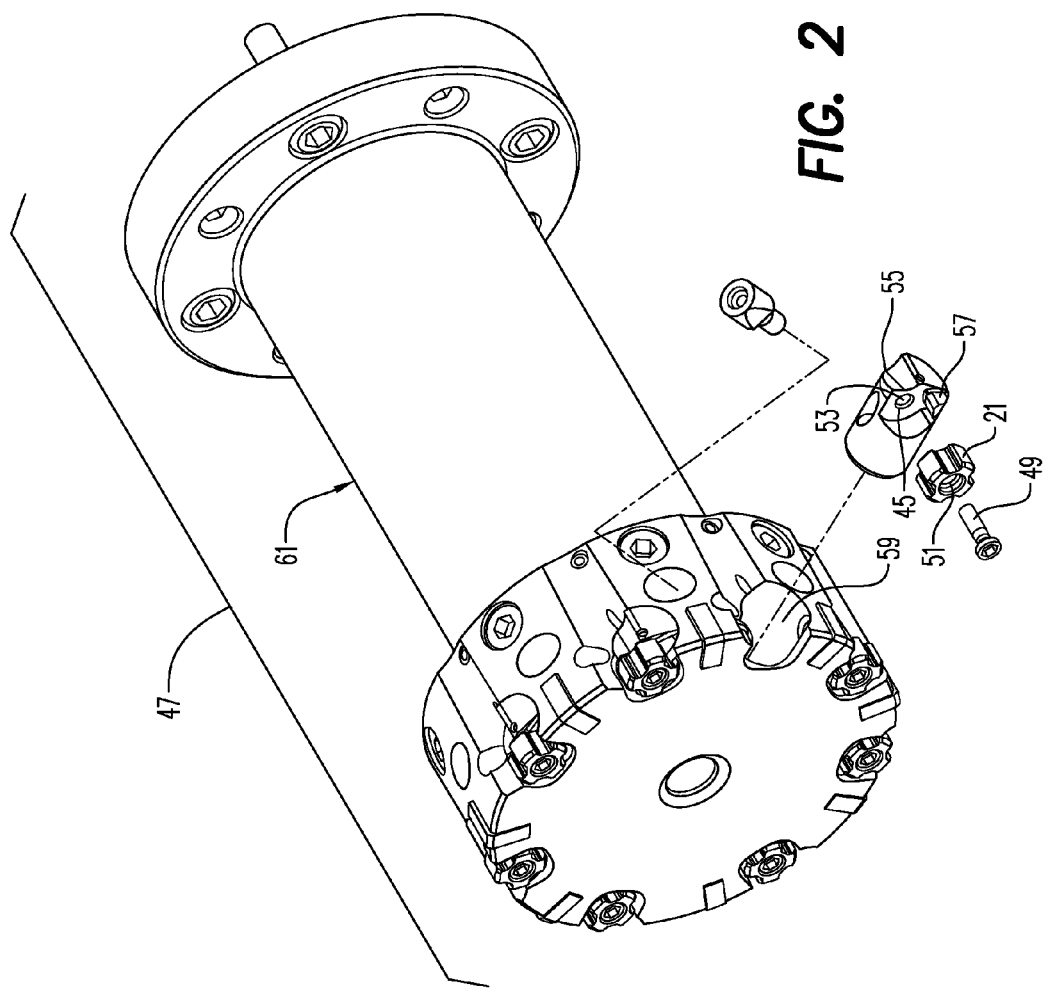

CUTTING INSERT, CUTTING TOOL, AND METHOD OF MACHINING

The present invention relates generally to cutting inserts and, more particularly, to indexable cutting inserts.

Cutting tools used for operations such as metal machining in operations such as milling, drilling, boring, and turning are often provided with replaceable cutting inserts having cutting edges that are used instead of a cutting edge formed integrally with a main body of the tool. It is known to provide indexable cutting inserts that can be turned to a plurality of different positions to expose one or more cutting edge to the workpiece in each position. In this way, it is not necessary to, for example, purchase a new cutting insert each time a cutting edge gets worn.

It is desirable to provide a cutting insert that is indexable to a plurality of positions.

According to an aspect of the present invention, a cutting insert comprises a body having a first surface, a second surface, and an intermediate surface. The intermediate surface comprises a generally cylindrical main surface and at least one recess surface extending radially inwardly from the main surface, the main surface and the recess surface extending between the first surface and the second surface. A cutting edge is defined by an intersection between the main surface and the recess surface.

According to another aspect of the present invention, a method of machining is provided. The method includes mounting a cutting insert on a tool holder, the cutting insert comprising a body having a first surface, a second surface, and an intermediate surface, the intermediate surface comprising a generally cylindrical main surface and at least one recess surface extending radially inwardly from the main surface, the main surface and the recess surface extending between the first surface and the second surface, cutting edges being defined by an intersection between the main surface and the recess surface, such that one cutting edge formed by the intersection of the recess surface and the main surface extends beyond a periphery of the tool holder and forms a working cutting edge. Cutting operations are performed with the working cutting edge. The mounting of the cutting insert is changed so that another cutting edge formed by the intersection of the recess surface and the main surface extends beyond the periphery of the tool holder and forms the working cutting edge.

BRIEF DESCRIPTION OF THE DRAWINGS

The features and advantages of the present invention are well understood by reading the following detailed description in conjunction with the drawings in which like numerals indicate similar elements and in which:

FIG. 1A is a perspective view of a cutting insert according to an embodiment of the present invention, and FIGS. 1B-1D are plan views of three different sides of the cutting insert of FIG. 1A; and FIG. 2 is a partially exploded, perspective view of a cutting tool using a cutting insert according to an embodiment of the present invention.

DETAILED DESCRIPTION

A cutting insert 21 according to an embodiment of the present invention is shown in FIGS. 1A-1D. The cutting insert 21 comprising a body 23 having a first surface 25, a second surface 27, and an intermediate surface 29. The intermediate surface 29 comprises a generally cylindrical main surface 31 and at least one recess surface 33 extending radially inwardly from the main surface. The intermediate surface 29 can be circularly cylindrical as shown in FIGS. 1A-1D, however, it may have other generally cylindrical shapes. In the embodiment of FIGS. 1A-1D, a plurality of recess surfaces 33 divide the main surface 31 into a plurality of segments. The cutting insert 21 may be made out of any material commonly used to make cutting inserts, such as cemented carbide.

The main surface 31 and the recess surface 33 extend between but not necessarily to the first surface 25 and the second surface 27. As seen in FIGS. 1A and 1C, the recess surfaces 33 extend from the first surface 25 to the second surface 27, while a chamfer surface 35 is disposed between the main surface 31 and each of the first surface and the second surface. A further chamfer 37 is disposed between the chamfer surfaces 35 and the recess surfaces 33.

A cutting edge 39 is defined by an intersection between the main surface 31 and the recess surface 33. In the embodiment illustrated in FIG. 1A-1D, there are four recess surfaces 33 and, consequently, eight intersections between the recess surfaces and the main surface 31. In this embodiment, each of the eight intersections defines a cutting edge 39.

The first surface 25 and the second surface 27 can each comprise a generally planar supporting surface 41 and 43, respectively, for supporting the insert relative to a bottom abutment surface 45 on a tool holder 47 such as is seen in FIG. 2. Usually, the insert 21 will be clamped to the abutment surface 45 by a clamping screw 49 that extends through a hole 51 in the insert and into an internally threaded hole 53 on the tool holder 47. A tool holder comprising a removable cassette 55 is particularly well-suited for use in connection with the insert of the present invention and is described in more detail in commonly assigned SE Application No. 0700859-2 which is incorporated by reference. The internally threaded hole 53 can be provided on the cassette 55. While planar supporting and abutment surfaces are described in the present application for purposes of discussion, it will be appreciated that the supporting and abutment surfaces need not be flat and/or planar, and may be curved, grooved, or otherwise shaped as may be appropriate.

The tool holder 47 can also be provided with one or more side abutment surfaces 57 for abutting surfaces on the insert 21 to prevent the insert from rotating about the clamping screw 49. For the insert 21 in the embodiment of FIG. 1A-1D, side abutment surfaces 57 are provided on the removable cassette 55 shown in FIG. 2 and abut one of the recess surfaces 33 that, in the particular indexed position of the insert 21, does not define a working cutting edge 39. It is also known to form side abutment surfaces in recesses 59 of a tool holder body 61 to which the insert 21 is mounted, with or without a cassette 55.

An identifying indicia 63 such as a number or a letter can be provided to correspond to each cutting edge 39 on the insert 21. The indicia 63 will ordinarily be provided on the first and second surfaces 25 and 27.

When the insert 21 is mounted on a tool holder 47 as shown in FIG. 2, the main surface 31 defines a relief or clearance surface, i.e., defined here as the surface that follows the cutting edge 39 in a direction of movement of the insert relative to a workpiece. In the insert 21, the recess surface 33 defines a rake surface. As seen, for example, in FIGS. 1B and 1D, a first portion 65 of the recess surface 33 generally adjacent to the main surface 31 extends radially inwardly from the main surface along a plane intersecting a central axis of the cutting insert. A second portion 67 of the recess surface 33 disposed radially inward from the first portion 65 deviates from the plane inwardly generally toward a center C of a recess 69 defined by the recess surface. A third portion 71 of the recess surface 33 disposed radially inwardly from the second portion 67 extends generally away from the center C of the recess 69. A fourth portion 73 of the recess surface 33 disposed radially inwardly from the third portion 71 is substantially planar. A radiused surface can be provided between the fourth portion 73 and the third portion 71 and can assist in locating the cutting insert 21 relative to a side abutment surface 57 when mounting the cutting insert on a toolholder 47. While other shapes for the recess surface 33 than that defined by the first, second, third, and fourth portions 65, 67, 71, and 73 can be provided, the illustrated shape can facilitate chip formation and breakage.

In a method of machining according to an aspect of the present invention, a cutting insert 21 is mounted on a tool holder 47. The cutting insert 21 is mounted on the tool holder 47 such that one cutting edge 39 formed by the intersection of the recess 33 and the main surface 31 extends beyond a periphery of the tool holder and forms a working cutting edge. Cutting operations can be performed with the working cutting edge 39 and the mounting of the cutting insert 21 can thereafter be changed, usually after the cutting edge 39 is worn to a particular point or has been in service for a particular length of time, so that another cutting edge extends beyond the periphery of the tool holder and forms the working cutting edge.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

The disclosures in Swedish patent application Nos. 0700859-2 and 0700860-0, from which this application claims priority, are incorporated herein by reference.

While this invention has been illustrated and described in accordance with a preferred embodiment, it is recognized that variations and changes may be made therein without departing from the invention as set forth in the claims.

What is claimed is:

1. A cutting insert, comprising a body having a first surface, a second surface, and a cylindrical intermediate surface, the intermediate surface comprising a main surface and at least one recess surface extending radially inwardly from the main surface toward a longitudinal axis of a cylinder defined by the intermediate surface, the main surface and the recess surface extending between the first surface and the second surface, wherein the main surface and the recess surface intersect along at least two edges, a cutting edge being defined by each intersection between the main surface and the recess surface.

2. The cutting insert as set forth in claim 1, wherein the recess surface extends from the first surface to the second surface.

3. The cutting insert as set forth in claim 1, comprising a chamfer surface between the main surface and each of the first surface and the second surface.

4. The cutting insert as set forth in claim 3, comprising a further chamfer between the chamfer surface and the recess surface.

5. The cutting insert as set forth in claim 1, wherein the first surface and the second surface each comprise a generally planar supporting surface.

6. The cutting insert as set forth in claim 1, comprising a plurality of recess surfaces.

7. The cutting insert as set forth in claim 1, comprising four recess surfaces forming eight cutting edges with the main surface.

8. The cutting insert as set forth in claim 1, comprising an identifying indicia corresponding to each cutting edge.

9. The cutting insert as set forth in claim 1, wherein the main surface defines a relief surface.

10. The cutting insert as set forth in claim 1, wherein the recess surface defines a rake surface.

11. The cutting insert as set forth in claim 1, wherein a first portion of the recess surface generally adjacent to the main surface extends radially inwardly from the main surface along a plane intersecting a central axis of the cutting insert.

12. The cutting insert as set forth in claim 1, wherein the main surface is generally circularly cylindrical.

13. A cutting tool comprising a tool holder and at least one cutting insert as claimed in claim 1 mounted to the tool holder.

14. A cutting insert, comprising a body having a first surface, a second surface, and a cylindrical intermediate surface, the intermediate surface comprising a main surface and at least one recess surface extending radially inwardly from the main surface toward a longitudinal axis of a cylinder defined by the intermediate surface, the main surface and the recess surface extending between the first surface and the second surface, a cutting edge being defined by an intersection between the main surface and the recess surface, wherein a first portion of the recess surface generally adjacent to the main surface extends radially inwardly from the main surface in a first general direction and a second portion of the recess surface disposed radially inward from the first portion deviates from the first general direction inwardly toward a center of a recess defined by the recess surface.

15. The cutting insert as set forth in claim 14, wherein a third portion of the recess surface disposed radially inwardly from the second portion extends generally away from the center of the recess.

16. A cutting insert, comprising a body having a first surface, a second surface, and a cylindrical intermediate surface, the intermediate surface comprising a main surface and at least one recess surface extending radially inwardly from the main surface toward a longitudinal axis of a cylinder defined by the intermediate surface, the main surface and the recess surface extending, between the first surface and the second surface, a cutting edge being defined by an intersection between the main surface and the recess surface, wherein a first portion of the recess surface generally adjacent to the main surface extends radially inwardly from the main surface along a plane intersecting a central axis of the cutting insert, wherein a second portion of the recess surface disposed radially inward from the first portion deviates from the plane inwardly generally toward a center of a recess defined by the recess surface.

17. The cutting insert as set forth in claim 16, wherein a third portion of the recess surface disposed radially inwardly from the second portion extends generally away from the center of the recess.

18. The cutting insert as set forth in claim 17, wherein a fourth portion of the recess surface disposed radially inwardly from the third portion is substantially planar.

19. The cutting insert as set forth in claim 18, comprising a radiused surface between the fourth portion and the third portion.

* * * * *